United States Patent

[11] 3,613,096

[72] Inventor Charles William Earp
London, England
[21] Appl. No. 869,527
[22] Filed Oct. 27, 1969
[45] Patented Oct. 12, 1971
[73] Assignee International Standard Electric Corporation
New York, N.Y.
[32] Priority Dec. 13, 1968
[33] Great Britain
[31] 59338/68

[54] RADIO BEACON
3 Claims, 6 Drawing Figs.

[52] U.S. Cl. .................................................. 343/113 DE
[51] Int. Cl. .................................................. G01s 3/04
[50] Field of Search .................................... 343/113 DE

[56] References Cited
UNITED STATES PATENTS
3,290,685  12/1966  Steiner ..................... 343/113 DE X Primary Examiner—T. H. Tubbesing
Attorneys—C. Cornell Remsen, Jr., Walter J. Baum, Paul W. Hemminger, Percy P. Lantzy, Philip M. Bolton, Isidore Togut and Charles L. Johnson, Jr.

ABSTRACT: A radio beacon of the type comprising a linear array of equally spaced aerials, with a radio frequency source commutated successively to each aerial to simulate constant velocity motion of a single radiator in which the amplitude of the radiated signal is tapered from minimum amplitude at the ends of the array to maximum amplitude at the center of the array in order to eliminate the effect of phase discontinuity between successive sweeps. In a preferred embodiment, said tapering is achieved by connecting the commutator to each of the aerials via fixed attenuators. In another preferred embodiment, said tapering is achieved by modulating the radio frequency signal coupled to the commutator at the commutator rate.

Inventor
CHARLES W. EARP
By
Attorney

FIG.2
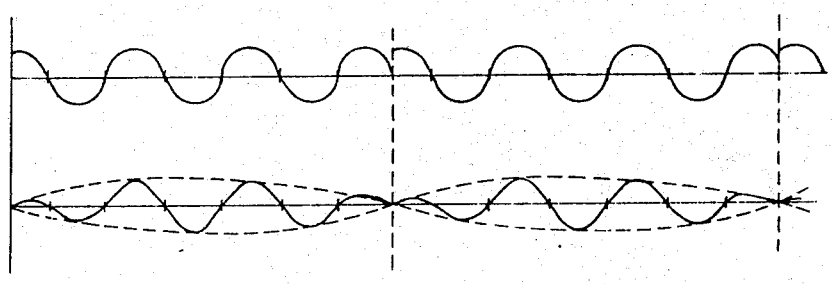
FIG.3
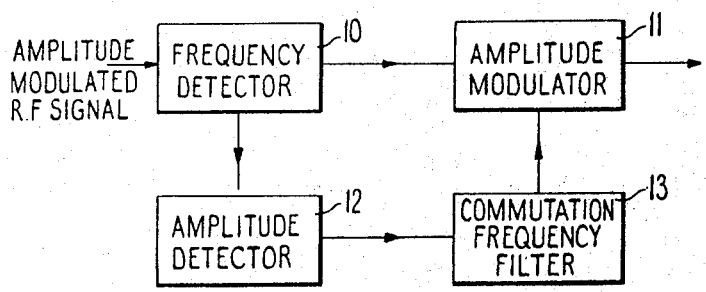
FIG.4

RADIO BEACON

BACKGROUND OF THE INVENTION

1. Field of the Invention

This invention relates to radio beacons for navigation or direction finding systems.

2. Description of the Prior Art

The proposal has been made to commutate a radio frequency source successively to the separate elements of a linear horizontal array of radiators, either to simulate unidirectional constant velocity motion of a single radiator, or to simulate to-and-fro constant velocity motion. It has also been proposed as described in copending U.S. Application No. 859,915 filed Sept. 22, 1969 by C. W. Earp to simulate such movement of a radiator in the vertical plane by commutation to a vertical stack of radiators.

In each of the above cases, the frequency spectrum of the signal received at a distance varies with direction, (i.e., with azimuth in the case of the horizontal array, and with elevation in the case of the vertical array).

In the case of successive unidirectional sweeps, the frequency of the received wave is similar to the frequency of the commutated source displaced in frequency by an amount varying with direction. In general, however, due to the phase transient between successive sweeps, the spectrum includes a number of "Fourier" components spaced at intervals corresponding to the frequency of the scanning sweep of aerial excitation.

Owing to the phase transient which must occur at most positions in space, the total spectrum may be unnecessarily wide.

SUMMARY OF THE INVENTION

It is an object of the invention to minimize the transmission of phase transient signals from a radio beacon.

According to the invention there is provided a radio beacon for simulating a moving source of electromagnetic energy comprising a radio frequency signal source, an array of linearly spaced aerials, a commutator cyclically coupling said signal source to said array of spaced aerials, means for Controlling the commutator rate and means for tapering the amplitude of the radio frequency signal radiated by said array from a minimum amplitude at each end of the array to a maximum amplitude at the center of the array.

BRIEF DESCRIPTION OF THE DRAWINGS

The above-mentioned and other objects of this invention will become apparent by reference to the following description in conjunction with the accompanying drawings, in which:

FIG. 2 shows a waveform transmitted with constant amplitude;

FIG. 3 shows a waveform transmitted with varying amplitude; and

FIG. 4 is a schematic diagram of part of a radio receiver for obtaining a reduced spectrum beat signal.

Referring to FIG. 1 there is shown a linear aerial array (horizontal or vertical) which includes a number of equally spaced radiating elements, some of which are shown at 2, 3, 4 and 5. Each of the elements of the array is connected by a feeder, such as 6, to a commutator arrangement 7. The commutator 7 is connected to a radio transmitter 8 and to a low frequency generator 9.

Radio signals of a given frequency, for example 4GHz, from the transmitter 8 are fed successively and cyclically by the commutator 7 to each of the elements of the array over the corresponding feeder to simulate constant velocity unidirectional motion of a single radiator along the array. The commutation process is controlled by a signal from the low frequency generator 9, the commutation or scanning frequency being typically 30 Hz.

As shown in FIG. 2, if the waveform from the array produced by successive unidirectional sweeps across the linear array were of constant amplitude, phase transients would occur at the end of each sweep.

To substantially eliminate such phase transients, the waveform which is actually radiated may be tapered from a minimum amplitude at each end of the array to a maximum amplitude at the center.

The law of taper required for minimum width of spectrum corresponds to the amplitude taper required when all radiating elements are fed simultaneously to produce a directive lobe of radiation, when it is desired to minimize the amplitude of side lobes to avoid the effects of reflecting obstacles outside the nominal beam-width of the system.

Figure 1:
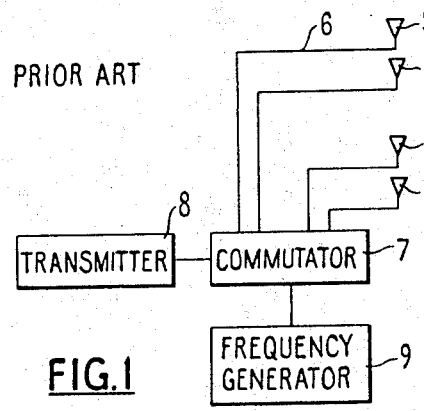
FIG. 1 is a schematic diagram of a radio beacon.
Figure 1A:
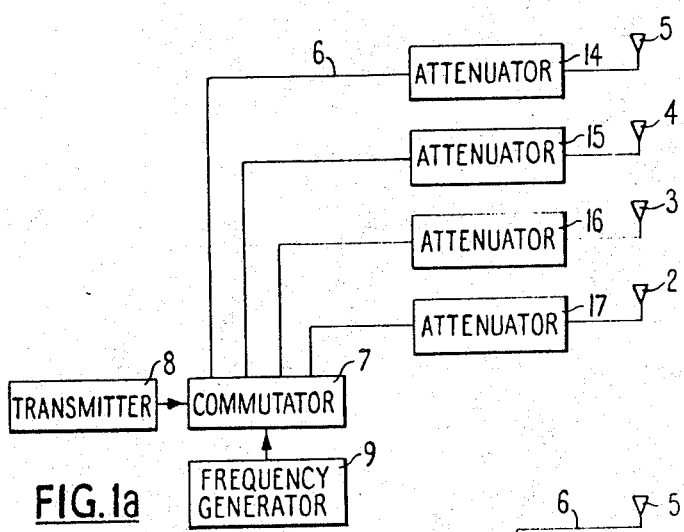
FIG. 1a is a schematic diagram of a radio beacon according to the invention.

As shown in FIG. 1a, the desired amplitude tapering of radiated signals can be produced by placing different attenuating pads such as 14 and 15 in the separate feeds to the aerials.

Figure 1B:
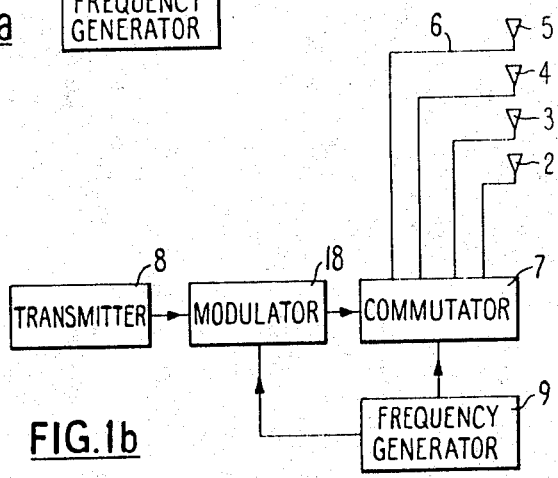
FIG. 1b is a schematic diagram of another radio beacon according to the invention.

Alternatively, the amplitude of the source of radiation can be modulated synchronously with the commutation cycle. This is achieved, as shown in FIG. 1b, by coupling transmitter 8 to commutator 7 via modulator 18 and by modulating the RF signal with an output from frequency generator 9.

The waveforms shown in FIG. 2 and 3 also represent the beat frequency received in a practical system in which a fixed radio frequency reference wave, offset by a known fixed frequency from the frequency of the commutated wave, is radiated from the ground beacon by an additional aerial (not shown).

In the case of beacons in which the source is commutated to-and-fro over the length of the array, to simulate constant velocity bidirectional motion of a single radiator along the array, a double spectrum is radiated in each direction, corresponding to equal and opposite Doppler frequency displacements. In this case, amplitude tapering of the commutated signal is equally effective as in the case of the beacon of unidirectional sweep to largely eliminate the effect of phase discontinuity between successive sweeps.

In some applications, full tapering of the radiated signal may be undesirable, as the associated receiver may be required to operate on principles when full or nearly full amplitude of the received signal may be required.

In order to provide full compatibility for such receivers, it is possible to cause a small amount of tapering (30 percent reduction from maximum) of radiation from the array, and to perform the signal full amplitude tapering in the receiver. The small tapering at the transmitter permits the construction of the necessary rhythmic amplitude-tapering wave in the receiver. The necessary receiver arrangement as shown in FIG. 4, in which the original signal beat frequency from frequency detector 10 is passed directly to an amplitude modulator 11 and via an amplitude detector 12 and commutation frequency filter 13 to the amplitude modulator, the output from the amplitude modulator being the reduced-spectrum beat frequency signal.

The amplitude tapered signal may be utilized at a receiver to give a positive indication of its continued transmission.

I claim:

1. A radio beacon for simulating a moving source of electromagnetic energy comprising:
    a radio frequency signal source;
    an array of linearly spaced aerials;
    a commutator cyclically coupling said signal source to said array of spaced aerials;
    means for controlling the commutator rate; and
    means for tapering the amplitude of the radio frequency signal radiated by said array from a minimum amplitude at each end of the array to a maximum amplitude at the center of the array.

2. A radio beacon, according to claim 1, wherein said means for tapering the amplitude of the radio frequency signal radiated by said array includes attenuating means coupling said commutator to said array of spaced aerials.

3. A radio beacon, according to claim 1, wherein said means for tapering the amplitude of the radio frequency signal radiated by said array includes:

a modulator coupling said radio frequency signal source to said commutator; and
means coupled to said modulator for modulating said radio frequency signal in synchronism with said commutator rate.